United States Patent
Teo et al.

(10) Patent No.: US 8,233,239 B1
(45) Date of Patent: Jul. 31, 2012

(54) DISK DRIVE HEAD STACK ASSEMBLY HAVING FIRST AND SECOND SWAGE BOSSES WITH DIFFERENT INNER LIP PROFILES

(75) Inventors: Kia Moh Teo, San Jose, CA (US); Qiang Yang, Fremont, CA (US); Jian Yang, Fremont, CA (US); Jifang Tian, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 25 days.

(21) Appl. No.: 12/969,257

(22) Filed: Dec. 15, 2010

(51) Int. Cl.
*G11B 5/48* (2006.01)

(52) U.S. Cl. .................................... 360/244.6
(58) Field of Classification Search ............... 360/244.6
See application file for complete search history.

(56) References Cited

U.S. PATENT DOCUMENTS

| | | | |
|---|---|---|---|
| 5,187,626 A | 2/1993 | Hopkins et al. | |
| 5,225,949 A | 7/1993 | King et al. | |
| 5,262,911 A | 11/1993 | Cain et al. | |
| 5,265,325 A | 11/1993 | Fortin | |
| 5,461,525 A | 10/1995 | Christianson et al. | |
| 5,646,802 A | 7/1997 | Akiyama et al. | |
| 5,717,545 A | 2/1998 | Brooks, Jr. et al. | |
| 5,796,555 A | 8/1998 | Aoyagi et al. | |
| 5,896,245 A | 4/1999 | Aoyagi et al. | |
| 5,963,383 A | 10/1999 | Jurgenson | |
| 5,973,885 A | 10/1999 | Hanrahan et al. | |
| 6,033,755 A | 3/2000 | Hanrahan et al. | |
| 6,035,681 A | 3/2000 | Chung et al. | |
| 6,046,885 A | 4/2000 | Aimonetti et al. | |
| 6,069,772 A * | 5/2000 | Braunheim et al. | 360/244.6 |
| 6,128,164 A | 10/2000 | Kant et al. | |
| 6,141,868 A | 11/2000 | Schmidt et al. | |
| 6,175,474 B1 | 1/2001 | Boutaghou et al. | |
| 6,183,841 B1 | 2/2001 | Hanrahan et al. | |
| 6,185,072 B1 | 2/2001 | Braunheim et al. | |
| 6,215,624 B1 | 4/2001 | Summers et al. | |
| 6,368,685 B1 | 4/2002 | Schmidt et al. | |
| 6,372,314 B1 | 4/2002 | Schmidt et al. | |
| 6,388,841 B1 | 5/2002 | Summers | |
| 6,396,666 B1 | 5/2002 | Coon | |
| 6,417,994 B1 | 7/2002 | Yim et al. | |
| 6,424,497 B1 * | 7/2002 | Coon | 360/244.6 |
| 6,466,412 B1 | 10/2002 | Adams et al. | |
| 6,469,869 B1 | 10/2002 | Vera | |
| 6,697,224 B2 | 2/2004 | Wang et al. | |
| 6,704,995 B2 * | 3/2004 | Toensing et al. | 29/603.03 |
| 6,754,044 B1 | 6/2004 | Braunheim et al. | |
| 6,941,641 B2 | 9/2005 | Van Sloun | |
| 6,956,720 B2 | 10/2005 | Takagi et al. | |
| 7,024,754 B1 | 4/2006 | Crowder et al. | |
| 7,042,680 B1 | 5/2006 | Zhang et al. | |
| 7,130,156 B1 * | 10/2006 | Fossum | 360/244.6 |
| 7,170,716 B2 * | 1/2007 | Van Sloun et al. | 360/244.6 |
| 7,190,555 B2 | 3/2007 | Hanrahan et al. | |

(Continued)

*Primary Examiner* — Mark Blouin (57) ABSTRACT

A disk drive head stack assembly includes an actuator arm tip that includes a swaging hole centered about a swaging axis. A first suspension assembly has a first swage boss that protrudes into the swaging hole. A second suspension assembly has a second swage boss that protrudes into the swaging hole and does not contact the first swage boss. Each of the first and second swage bosses includes an inner lip that extends radially closer to the swaging axis than any other part of that swage boss. The inner lip thickness of the first swage boss, measured parallel to the swaging axis, increases more greatly with increasing radial distance from the swaging axis than does the inner lip thickness of the second swage boss.

24 Claims, 4 Drawing Sheets

U.S. PATENT DOCUMENTS

| | | |
|---|---|---|
| 7,313,855 B2 | 1/2008 | Van Sloun et al. |
| 7,324,307 B2 | 1/2008 | Brink et al. |
| 7,339,767 B1 | 3/2008 | Zhang et al. |
| 7,559,150 B2 | 7/2009 | Fernandez |
| 7,581,309 B2 * | 9/2009 | Matsumura et al. ....... 29/603.03 |
| 7,633,717 B1 | 12/2009 | Fossum et al. |
| 7,963,022 B2 * | 6/2011 | Baumgart et al. ......... 29/603.03 |
| 7,969,689 B2 * | 6/2011 | Moore et al. ............... 360/245.2 |
| 2004/0231139 A1 | 11/2004 | Jurgenson |
| 2005/0078407 A1 | 4/2005 | Diewanit et al. |
| 2006/0023363 A1 * | 2/2006 | Hanrahan et al. .......... 360/244.6 |
| 2006/0174472 A1 | 8/2006 | Zhang et al. |
| 2006/0221506 A1 | 10/2006 | Aoki et al. |
| 2006/0289311 A1 | 12/2006 | Brink et al. |
| 2007/0086114 A1 * | 4/2007 | Van Sloun et al. ......... 360/244.6 |
| 2007/0119045 A1 * | 5/2007 | Matsumura et al. ....... 29/603.03 |
| 2007/0146934 A1 | 6/2007 | Boljanovic et al. |
| 2009/0021009 A1 | 1/2009 | Baumgart et al. |

* cited by examiner

FIG. 4

DISK DRIVE HEAD STACK ASSEMBLY HAVING FIRST AND SECOND SWAGE BOSSES WITH DIFFERENT INNER LIP PROFILES

BACKGROUND

A typical hard disk drive includes a head disk assembly (HDA) and a printed circuit board assembly (PCBA) attached to a disk drive base of the HDA. The HDA typically includes a disk drive base and a disk drive cover that together enclose at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The HSA includes an actuator arm, having an actuator arm tip to which a head gimbal assembly (HGA) is typically attached by a process known as "swaging." The HGA typically includes a read head and a suspension assembly that suspends or supports the read head. However, in certain "depopulated" HSAs, a relatively inexpensive dummy mass may be swaged to an actuator arm tip instead of a relatively more expensive HGA, where the dummy mass does not support any read head. For example, a dummy mass may be swaged to an actuator arm tip in a depopulated HSA to add mass for balancing and/or for matching dynamic characteristics (to the known dynamic characteristics of the fully-populated HSA). For the purposes of this disclosure, such dummy masses will also be referred to as "suspension assemblies," even though they do not support any read head, since such dummy masses are typically designed to closely match the HGA that they replace from the viewpoint of the swaging process.

The read head is typically attached to a distal end of the suspension assembly, and a supported end of the suspension assembly is attached to an actuator arm that extends from the head actuator. The suspension assembly typically includes a load beam constructed of light sheet steel that includes a bend region. The bend region of the load beam acts as a spring that forces the read head against the disk surface with a specific desired pre-load force (also known as the "gram load"). The air bearing provides a reaction force that opposes the pre-load force in equilibrium. The suspension assembly also typically includes a laminated flexure that is attached to the load beam and to which the read head is electrically connected.

The suspension assembly also typically includes (at its supported end) a suspension base plate, also known as a "swage mount." The swage mount includes a flat flange portion and a protruding cylindrical hub portion or "swage boss." The swage boss typically protrudes through a clearance hole in the load beam, and the flange is spot welded to the load beam.

In a typical "swaging" process to attach a suspension assembly to an actuator arm, the swage boss protrudes into a corresponding swage hole in a distal tip region of the actuator arm. A swage ball is then temporarily forced through the swage boss during assembly, causing the swage boss to plastically expand radially, and therefore radially interfere with the corresponding swage hole in the actuator arm tip. After swaging, the outer periphery of the swage boss tightly engages and is radially preloaded against the inner periphery of the corresponding swage hole in the actuator arm tip.

Various problems with this method of attaching HGAs to actuator arms have arisen. For example, the plastic deformation associated with swaging may cause undesirable variation in the gram load, with the tolerance for such variation becoming smaller as the data storage capacity of disk drives has increased and read heads have been miniaturized. Hence, there is a need in the art for a disk drive head stack design that may reduce gram load variation that results from swaging.

Moreover, swaging can be a relatively expensive and time-consuming process in the context of high volume manufacturing of disk drives. Therefore, from a manufacturing process time and cost perspective, single-pass swaging may be preferred. However, creating the necessary radial plastic deformation to create sufficient radial interference for a robust swage attachment, in a single pass, can be a relatively violent process that may lead to unacceptable gram load variation in a population of swaged HGAs. Multi-pass swaging, where the necessary total radial plastic deformation is created iteratively by swaging more than once with progressively larger swage balls and/or by forcing the swage ball(s) through the swage bosses in alternating directions, can be too time consuming and expensive a process for high volume manufacturing. Therefore, there is a need in the art for a disk drive head stack design that may reduce gram load variation that results from single-pass swaging.

DESCRIPTION OF THE EXAMPLE EMBODIMENTS

Figure 1:
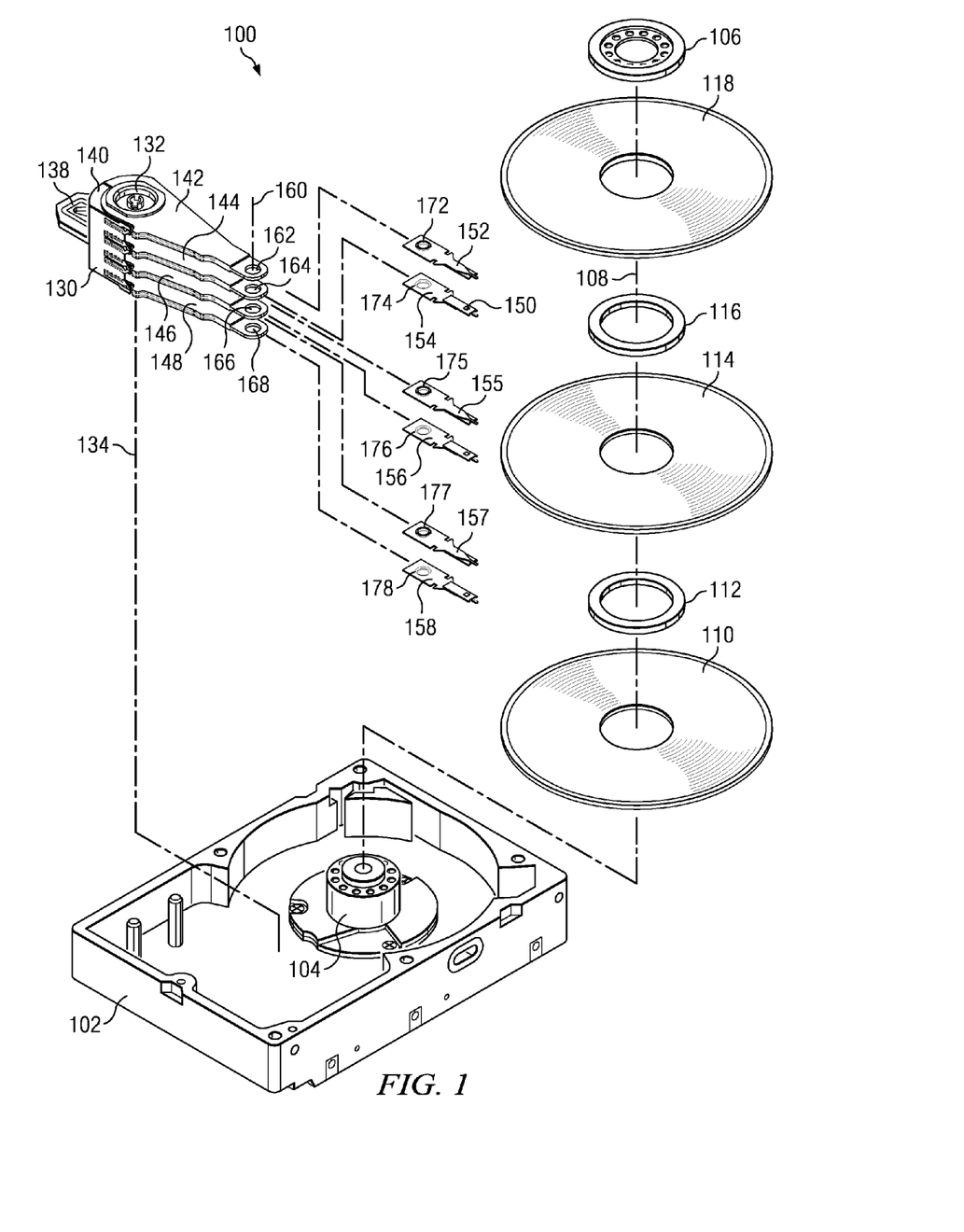
FIG. 1 is an exploded perspective view of a disk drive capable of embodying the present invention.

FIG. 1 is an exploded perspective view of a disk drive 100 capable of embodying the present invention. The disk drive 100 includes a disk drive base 102, and a rotary spindle 104 that is attached to the disk drive base 102. The disk drive base 102 may comprise cast aluminum, for example. The rotary spindle 104 may be a fluid bearing spindle, such as an air bearing spindle, or alternatively may be a high precision ball bearing spindle. The rotation of the rotary spindle 104 is preferably controlled to reach a constant rotational speed during disk drive operation, for example in the range 3600 rpm to 10000 rpm.

In the embodiment of FIG. 1, three disks 110, 114, and 118 are clamped to the rotary spindle 104, by a disk clamp 106. The disk clamp 106 may comprise aluminum or stainless steel, for example. The disks 110, 114, and 118 are separated by spacer rings 112 and 116 that are mounted on the rotary spindle 104 between the disks 110, 114, and 118. The rotary spindle 104 can rotate the disks 110, 114, and 118 about the spindle rotation axis 108. Each of the disks 110, 114, and 118 includes two major surfaces, and may include thin magnetic layers on each of the major surfaces to store data. Alternatively, the disks 110, 114, and 118 may be optical disks or magneto-optical disks.

In the embodiment of FIG. 1, a head stack assembly (HSA) 130 is attached to the disk drive base 102 by a pivot bearing cartridge 132 that allows the HSA 130 to rotate through at least a limited angular range about an actuator pivot axis 134. The pivot bearing cartridge 132 fits into a bore in the body of the actuator 140. The actuator pivot axis 134 is preferably parallel to the spindle rotation axis 108. In the embodiment of FIG. 1, the HSA 130 includes an actuator 140 having a topmost actuator arm 142, two middle actuator arms 144, 146, and a bottom-most actuator arm 148. The actuator 140 may also include an actuator coil 138 that protrudes in a direction that is generally opposite that of the actuator arms 142, 144, 146, and 148. The actuator 140 may comprise aluminum, magnesium, beryllium, iron, or an alloy that includes one of these metal elements. Alternatively the actuator 140 may comprise a different metal or be non-metallic (e.g. plastic, carbon, or a composite material).

In the embodiment of FIG. 1, the HSA 130 further includes six head gimbal assemblies (HGAs) 152, 154, 155, 156, 157, and 158, that are attached to the actuator arms 142, 144, 146, and 148 by swaging. During operation of the disk drive 100, the actuator 140 pivots about pivot axis 134 to position the HGAs adjacent desired information tracks on the disk. Each HGA 152, 154, 155, 156, 157, and 158 includes a suspension assembly that supports or suspends a head (hereinafter referred to as a "read head") for reading and/or writing data from and to an adjacent major surface of one of the disks 118, 114, 110. For example, HGA 154 includes a read head 150, with the rest of the HGA 154 being referred to as the suspension assembly to which the read head 150 is attached.

In magnetic recording applications, the read head 150 typically includes a slider and a conventional magnetic transducer (too small to be visible in the view of FIG. 1) that may comprise a writer and a read element. Other conventional transducer elements may also be included in the read head 150, for example to perform additional functions such as heating, microactuation, lapping control, etc. In optical recording applications, the read head 150 may include conventional mirror and objective lens elements for focusing laser light on to an adjacent disk surface. During operation of the disk drive 100, the read head 150 may be separated from the undersurface of the disk 118 by a gas lubrication film that is typically referred to as an "air bearing." The term "air bearing" is common because the lubricant gas is usually simply air (though alternative gases such as helium have been used).

In the embodiment of FIG. 1, only one HGA 152 is swaged to the top-most actuator arm 142, and only one HGA 158 is swaged to the bottom-most actuator arm 148. The HGA 152 is referred to as a "down" HGA because its read head faces downwards towards a major top surface of the disk 118, while the HGA 158 is referred to as an "up" HGA because its read head faces upwards towards a major undersurface of the disk 110. The down HGA 152 includes an annular swage boss 172 that protrudes upwards into a swaging hole 162 at the tip of the actuator arm 142. The up HGA 158 includes an annular swage boss 178 that protrudes downwards into a swaging hole 168 at the tip of the actuator arm 148.

Two HGAs 154, 155 are swaged to the middle actuator arm 144. The HGA 154 is referred to as an "up" HGA because its read head faces upwards towards a major under surface of the disk 118, while the HGA 155 is referred to as a "down" HGA because its read head faces downwards towards a major top surface of the disk 114. The up HGA 154 includes an annular swage boss 174 that protrudes downwards into a swaging hole 164 at the tip of the actuator arm 144. The down HGA 155 includes an annular swage boss 175 that protrudes upwards into the same swaging hole 164 at the tip of the actuator arm 144 (from the opposite side thereof).

Likewise, two HGAs 156, 157 are swaged to the middle actuator arm 146. The HGA 156 is referred to as an "up" HGA because its read head faces upwards towards a major under surface of the disk 114, while the HGA 157 is referred to as a "down" HGA because its read head faces downwards towards a major top surface of the disk 110. The up HGA 156 includes an annular swage boss 176 that protrudes downwards into a swaging hole 166 at the tip of the actuator arm 146. The down HGA 157 includes an annular swage boss 177 that protrudes upwards into the same swaging hole 166 at the tip of the actuator arm 146 (from the opposite side thereof).

Each of the swaging holes 162, 164, 166, and 168, at the tips of actuator arms 142, 144, 146, and 148, respectively, is centered about a swaging axis 160. During the swaging process, a swaging ball having a diameter large enough to interfere with the inner circumference of each of the annular swage bosses 172, 174, 175, 176, 177, 178, is forced through the swage bosses and the swaging holes 162, 164, 166, 168 that they protrude into. This causes each of the swage bosses to radially expand within (and therefore to radially interfere with) the corresponding swaging hole in the actuator arm tip. After swaging, the outer periphery of each swage boss tightly engages and is radially preloaded against the inner periphery of the corresponding swaging hole in the actuator arm tip.

Figure 2:
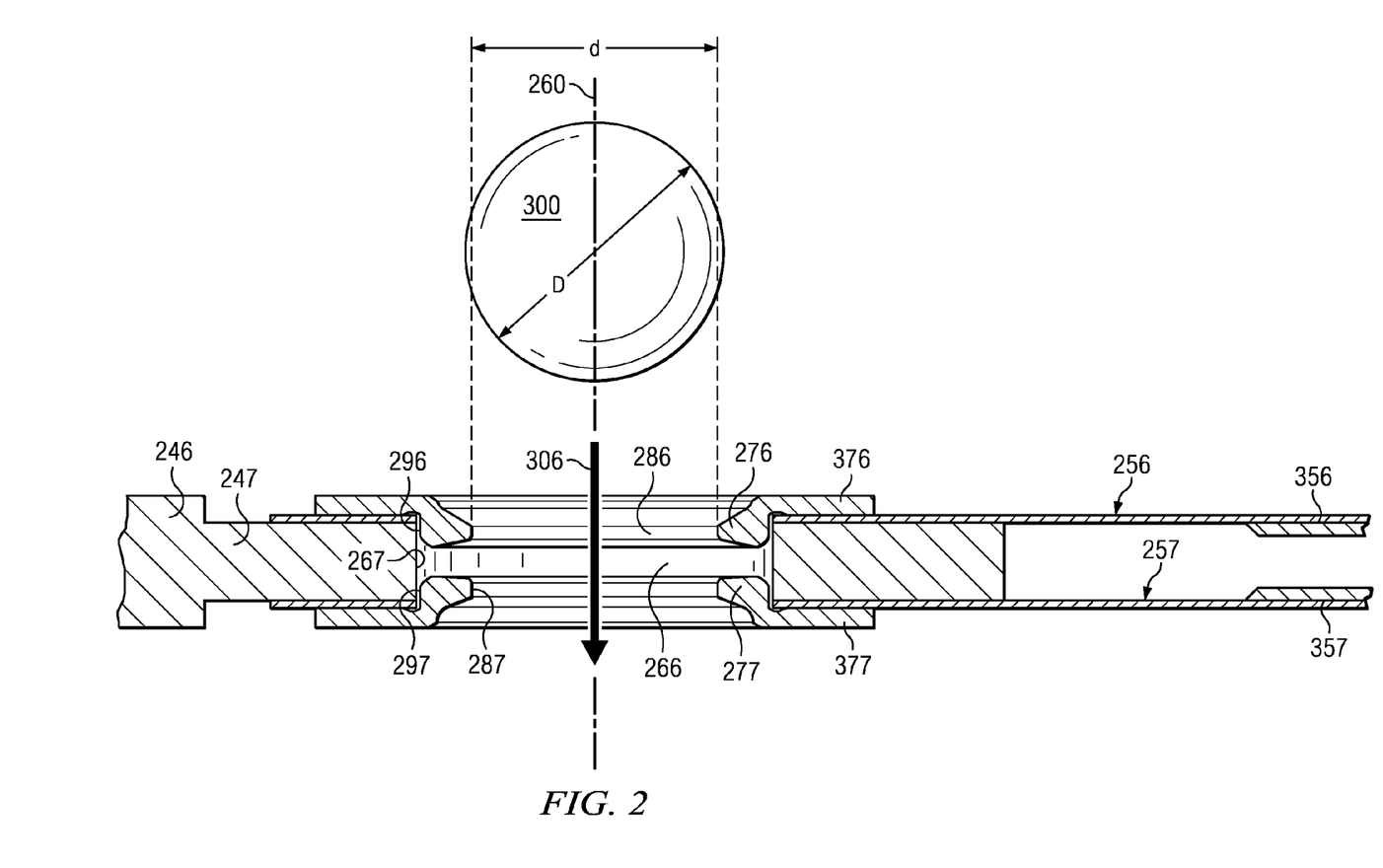
FIG. 2 is a cross-sectional view of an actuator arm tip and two suspension assemblies, before swaging, according to an embodiment of the present invention.

FIG. 2 is a cross-sectional view of a tip 247 of an actuator arm 246, and two suspension assemblies 256 and 257, before swaging, according to an embodiment of the present invention. The suspension assembly 256 includes a load beam 356 and a swage mount 376 at the supported end of the load beam 356. The swage mount 376 has flat flange portion that is spot welded to the load beam 356, and a swage boss 276 that protrudes through a clearance hole in the load beam 356. Likewise, the suspension assembly 257 includes a load beam 357 and a swage mount 377 at the supported end of the load beam 357. The swage mount 377 has flat flange portion that is spot welded to the load beam 357, and a swage boss 277 that protrudes through a clearance hole in the load beam 357.

In the embodiment of FIG. 2, the two suspension assemblies 256, 257 are swaged to a middle actuator arm 246. The swage boss 276 of the up suspension assembly 256 protrudes downwards into a swaging hole 266 that extends through a tip 247 of the actuator arm 246. The swaging hole 266 is centered about a swaging axis 260, and the swage boss 276 is annular about the swaging axis 260. The swage boss 277 of the down suspension assembly 257 protrudes upwards into the same swaging hole 266 (from the opposite side of the actuator arm tip 247), and that is also annular about the swaging axis 260. In the embodiment of FIG. 2, the actuator arm tip 247 is preferably thick enough that the swage bosses 276 and 277 do not contact each other. The swage bosses 276 and 277 may comprise stainless steel, for example.

In the embodiment of FIG. 2, the swage boss 276 includes a first inner lip 286. The first inner lip 286 extends radially closer to the swaging axis 260 than any other part of the first swage boss 276. The swage boss 277 includes a first inner lip 287. The first inner lip 287 extends radially closer to the swaging axis 260 than any other part of the first swage boss 277. In the embodiment of FIG. 2, the first inner lip 286 defines an inner diameter d of the swage boss 276. Note that the cross-sectional view of FIG. 2 is expanded (not necessarily to scale) to better depict HSA structural aspects that are most relevant to the swaging process. Hence, only portions of the suspension assemblies 256 and 257 are visible in the cross-sectional view of FIG. 2, with non-depicted portions lying to the right of the rightmost limit of the page.

During the swaging process, a force 306 may be imparted to a swaging ball 300 to force it to move along the swaging axis 260. The swaging ball 300 preferably has a diameter D that is larger than the inner diameter d of the swage boss 276, and that is larger than the inner diameter of the swage boss 277. The swaging ball is forced through the swage bosses 276, 277 and through the swaging hole 266 in the actuator arm tip 247. This preferably causes each of the swage bosses 276, 277 to plastically expand (radially with respect to the swaging hole 266) within the swaging hole 266. Due to such plastic radial expansion, the swage bosses 276, 277 may radially interfere with the swaging hole 266 in the actuator arm tip 247. After swaging, the outer periphery 296 of the swage boss 276 preferably tightly engages (i.e. is radially preloaded against) the inner periphery 267 of the swaging hole 266 in the actuator arm tip 247. Likewise, after swaging, the outer periphery 297 of the swage boss 277 preferably tightly engages (i.e. is radially preloaded against) the inner periphery 267 of the swaging hole 266 in the actuator arm tip 247.

Figure 3:
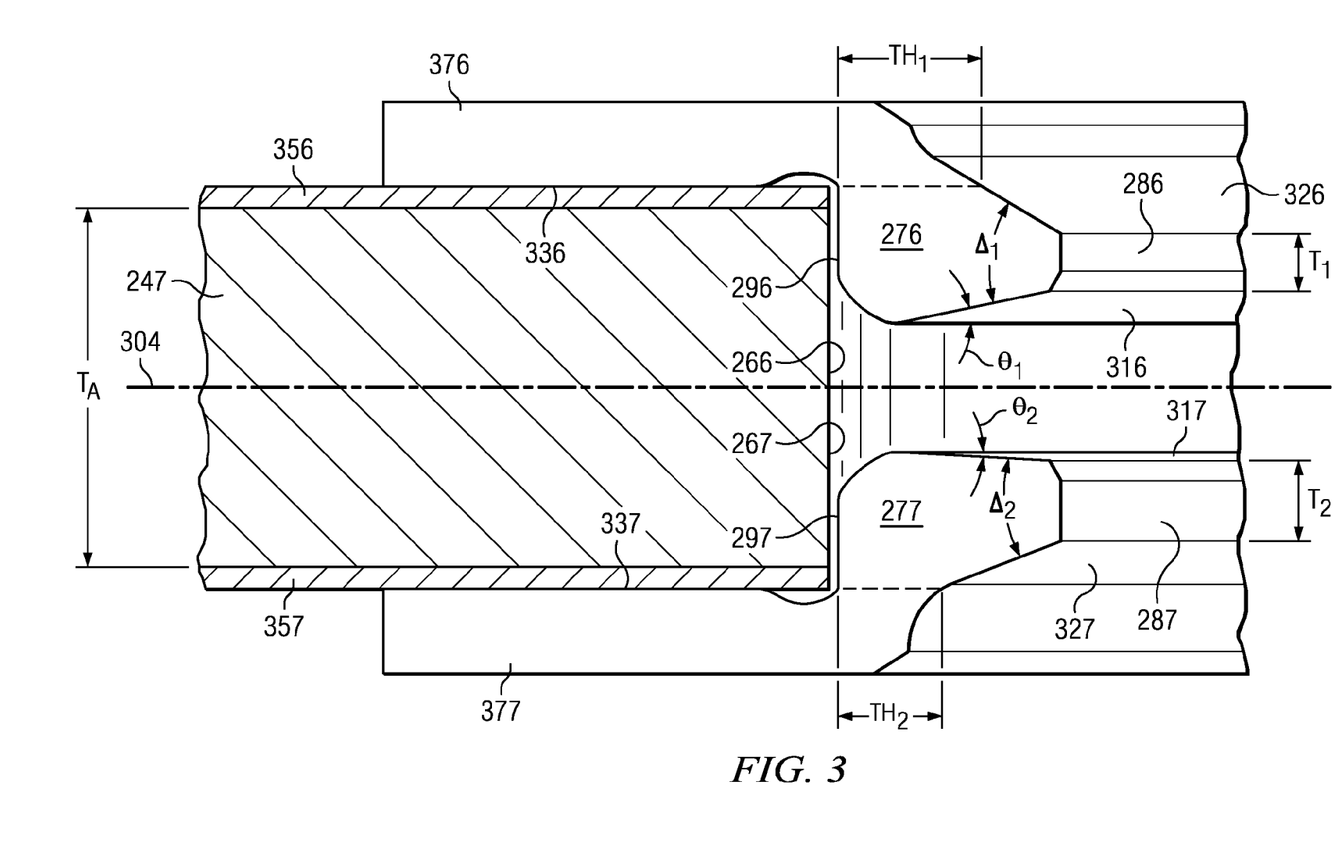
FIG. 3 is an expanded view of a portion of the cross section of FIG. 2.

FIG. 3 is an further expanded view of a portion of the cross section of FIG. 2 (not necessarily to scale). Now referring to FIGS. 2 and 3, the inner lip 286 defines an inner lip thickness $T_1$ measured parallel to the swaging axis 260. The inner lip 287 defines an inner lip thickness $T_2$ measured parallel to the swaging axis 260. In the embodiment of FIG. 3, but not necessarily, the inner lip thickness $T_2$ is greater than inner lip thickness $T_1$. In certain embodiments, the inner lip thickness $T_2$ is preferably but not necessarily at least 30 microns greater than inner lip thickness $T_1$. In the embodiment of FIG. 3, such design inequalities may advantageously reduce gram load variability caused by the swaging process (especially but not necessarily a single-pass swaging process).

In the embodiment of FIGS. 2 and 3, the inner lip thickness $T_1$ increases more greatly with increasing radial distance from the swaging axis 260 than does the inner lip thickness $T_2$. For example, an increase of the inner lip thickness $T_1$ with increasing radial distance from the swaging axis 260 defines a first taper angle $\Delta_1$, and an increase of the inner lip thickness $T_2$ with increasing radial distance from the swaging axis 260 defines a second taper angle, $\Delta_2$, with the first taper angle $\Delta_1$ being greater than the second taper angle $\Delta_2$. In certain embodiments, the first taper angle $\Delta_1$ is preferably greater than the second taper angle $\Delta_2$ by at least 4 degrees. In the embodiment of FIG. 3, such design inequalities may advantageously reduce gram load variability caused by the swaging process (especially but not necessarily a single-pass swaging process).

In the embodiment of FIGS. 2 and 3, the up suspension assembly 256 includes a swage mount 376 that has a flat face 336 facing the actuator arm tip 247. The swage boss 276 protrudes downward from the swage mount 376, through a clearance opening in the load beam 356, and into the hole 266 of the actuator arm tip 247 (from above). The swage boss 277 protrudes upwards from the swage mount 377 of the down suspension assembly 257, through a clearance opening in the load beam 357, and into the hole 266 of the actuator arm tip 247 (from below). The swage mount 377 includes a flat face 337 that faces the actuator arm tip 247.

In the embodiment of FIGS. 2 and 3, the swage boss 276 defines a swage boss radial thickness $TH_1$ measured between an outer periphery 296 of the swage boss 276 and a canted face 326, along a radius that is tangent to the flat face 336 and extends normally from the swaging axis 260. The swage boss 277 defines a swage boss radial thickness $TH_2$ measured between an outer periphery 297 of the swage boss 277 and a canted face 327, along a radius that is tangent to the flat face 337 and extends normally from the swaging axis 260.

In the embodiment of FIG. 3, the first swage boss radial thickness $TH_1$ is greater than the second swage boss radial thickness $TH_2$. In certain embodiments, the first swage boss radial thickness $TH_1$ is preferably but not necessarily at least 50 microns greater than the second swage boss radial thickness $TH_2$. In the embodiment of FIG. 3, such design inequalities may advantageously reduce gram load variability caused by the swaging process (especially but not necessarily a single-pass swaging process).

In the embodiment of FIGS. 2 and 3, the actuator arm tip 247 defines an actuator arm tip thickness $T_A$ that is bisected by a half-thickness plane 304. The half-thickness plane 304 is normal to the swaging axis 260. The swage boss 276 includes an apex face 316 that reaches closer to the half-thickness plane 304 than any other surface of the swage boss 276. The swage boss 277 includes an apex face 317 that reaches closer to the half-thickness plane 304 than any other surface of the swage boss 277. In the embodiment of FIG. 3, a relief angle $\theta_1$ between the apex face 316 and the half-thickness plane 304 is preferably but not necessarily at least 4 degrees greater than a relief angle $\theta_2$ between the apex face 317 and the half-thickness plane 304. In the embodiment of FIG. 3, this design inequality may advantageously reduce gram load variability caused by the swaging process (especially but not necessarily a single-pass swaging process).

Figure 4:
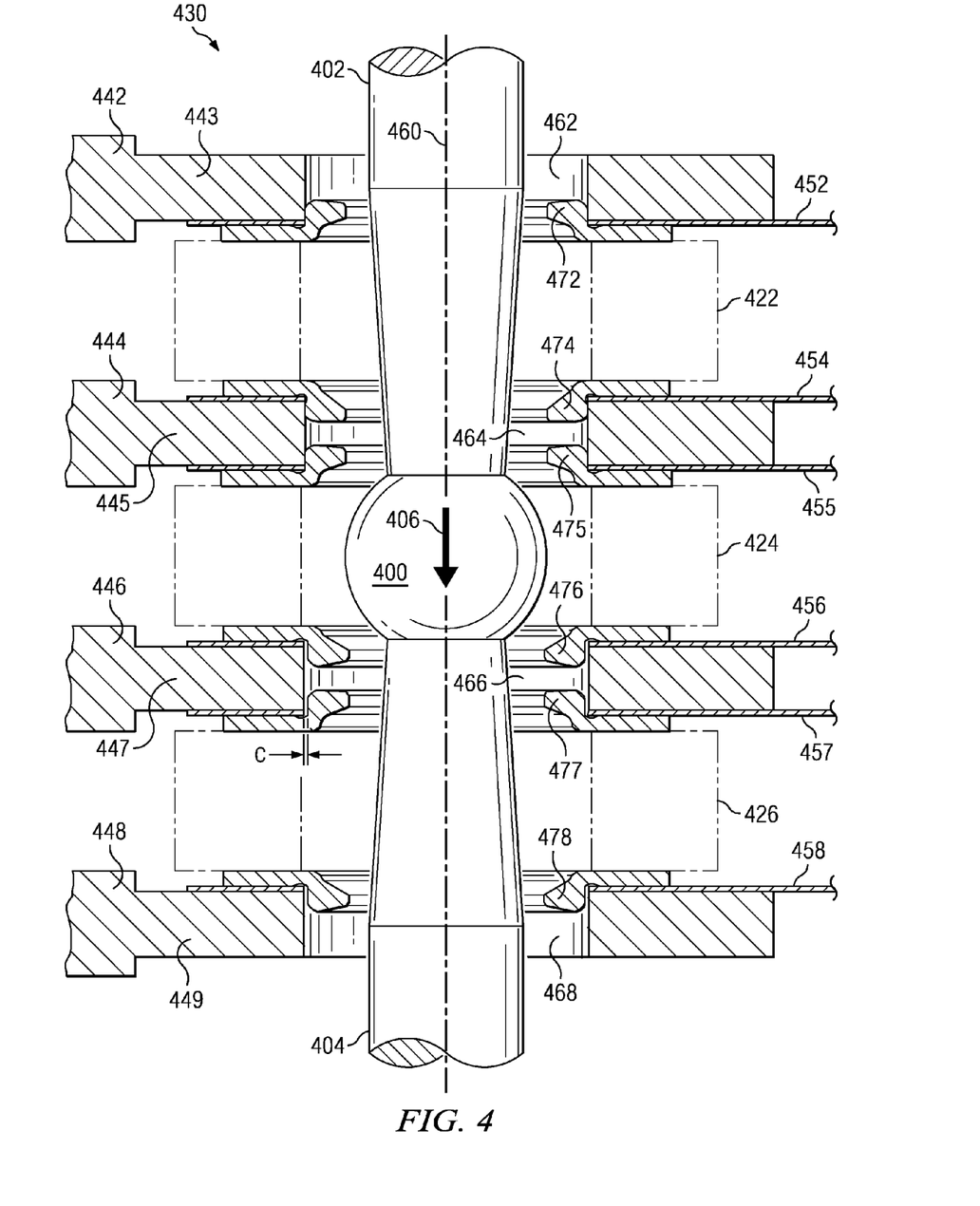
FIG. 4 is a cross-sectional view of a head stack assembly during swaging, according to an embodiment of the present invention.

FIG. 4 is a cross-sectional view of an HSA 430 during swaging, according to an embodiment of the present invention. In the embodiment of FIG. 4, the HSA 430 includes a top-most actuator arm 442, two middle actuator arms 444, 446, and a bottom-most actuator arm 448. The HSA 430 further includes six HGAs 452, 454, 455, 456, 457, and 458, that are being attached to the actuator arms 442, 444, 446, and 448 by swaging. Note that the cross-sectional view of FIG. 4 is expanded (not necessarily to scale) to better depict the structural aspects of the HSA 430 that are most relevant to the swaging process. Hence, only a portion of the suspension assembly of each HGA 452, 454, 455, 456, 457, and 458 is visible in the cross-sectional view of FIG. 4. For example the read head and much of the suspension assembly that supports the read head, in each of the HGAs 452, 454, 455, 456, 457, and 458, would lie to the right of the rightmost limit of the page in the cross-sectional view of FIG. 4.

In the embodiment of FIG. 4, only one HGA 452 is swaged to a tip 443 of the top-most actuator arm 442, and only one HGA 458 is swaged to a tip 449 of the bottom-most actuator arm 448. The HGA 452 is referred to as a "down" HGA because during operation its read head (if any) will face downwards towards a major top surface of an adjacent disk, while the HGA 458 is referred to as an "up" HGA because during operation its read head (if any) will face upwards towards a major undersurface of an adjacent disk. The down HGA 452 includes an annular swage boss 472 that protrudes upwards into a swaging hole 462 at the tip 443 of the actuator arm 442. The up HGA 458 includes an annular swage boss 478 that protrudes downwards into a swaging hole 468 at the tip 449 of the actuator arm 448.

In the embodiment of FIG. 4, two HGAs 454, 455 are swaged to a tip 445 of the middle actuator arm 444. The HGA 454 is referred to as an "up" HGA because during operation its read head (if any) will face upwards towards a major undersurface of an adjacent disk, while the HGA 455 is referred to as a "down" HGA because during operation its read head (if any) will face downwards towards a major top surface of an adjacent disk. The up HGA 454 includes an annular swage boss 474 that protrudes downwards into a swaging hole 464 at the tip 445 of the actuator arm 444. The down HGA 455 includes an annular swage boss 475 that protrudes upwards into the same swaging hole 464 at the tip 445 of the actuator arm 444 (from the opposite side thereof).

Likewise in the embodiment of FIG. 4, two HGAs 456, 457 are swaged to a tip 447 of the middle actuator arm 446. The HGA 456 is referred to as an "up" HGA because during operation its read head (if any) will face upwards towards a major undersurface of an adjacent disk, while the HGA 457 is referred to as a "down" HGA because during operation its read head (if any) will face downwards towards a major top surface of an adjacent disk. The up HGA 456 includes an annular swage boss 476 that protrudes downwards into a swaging hole 466 at the tip 447 of the actuator arm 446. The down HGA 457 includes an annular swage boss 477 that protrudes upwards into the same swaging hole 466 at the tip 447 of the actuator arm 446 (from the opposite side thereof).

In the embodiment of FIG. 4, each of the swaging holes 462, 464, 466, and 468, at the tips 443, 445, 447, 449 of actuator arms 442, 444, 446, and 448, respectively, is centered about a swaging axis 460. Prior to any swaging, the structural geometry of the pair of swage bosses 474, 475 could have been to that of the pair of swage bosses 276, 277 described earlier with reference to FIGS. 2 & 3, respectively. Likewise, the pair of swage bosses 476, 477 of FIG. 4 are shown immediately prior to swaging as having a structural geometry that is similar to the pair of swage bosses 276, 277 described earlier with reference to FIGS. 2 & 3, respectively.

During the swaging process, a swaging ball 400 having a diameter large enough to interfere with the inner circumference of each of the annular swage bosses 472, 474, 475, 476, 477, 478, is forced axially through the annular swage bosses and through the swaging holes 462, 464, 466, 468 that they protrude into. For example, the axial force 406 necessary to accomplish swaging may be applied to the swaging ball 400 by a tool 402, with another optional tool 404 that may be used to help to control the motion of the swaging ball 400 during the swaging process. Comb spacer tools 422, 424, and 426 may be temporarily positioned between the actuator arms 442, 444, 446, and 448, respectively, as shown, to limit axial actuator arm deflection that might otherwise be caused by the applied axial force 406. The passing of the swaging ball 400 (axially through each of the annular swage bosses) causes each of the swage bosses to plastically radially expand within (and therefore to radially interfere with) the corresponding swaging hole in the actuator arm tip. After swaging, the outer periphery of each swage boss preferably tightly engages and is radially preloaded against the inner periphery of the corresponding swaging hole in the actuator arm tip.

For example, in the view of FIG. 4, the swaging ball 400 has been forced axially through the annular swage bosses 472, 474, and 475, and so has caused each of the swage bosses 472, 474, and 475 to have radially expanded within (and therefore to now radially interfere with) the corresponding swaging holes 462 and 464, respectively. Hence, the swage bosses 472, 474, and 475 are shown to tightly engage and be radially preloaded against the inner peripheries of the swaging holes 462 and 464, respectively. By contrast, in the view of FIG. 4, the swaging ball 400 has not yet been forced axially through the annular swage bosses 476, 477, and 478. Hence a radial clearance C still exists between the outer periphery of each of the annular swage bosses 476, 477, and 478 and the swaging holes 466 and 468, respectively.

Note that not all of the design inequalities (described earlier with respect to FIG. 2 or 3) necessarily apply in FIG. 4 to the annular swage bosses 474 and 475 after swaging. For example, as shown in FIG. 4, the plastic deformation associated with swaging the annular swage bosses 474 and 475 may have changed or affected one or more of the angular inequalities described earlier with respect to FIG. 3. Hence, one or more of the design inequalities (described earlier with respect to FIG. 2 or 3) may apply in FIG. 4 to the annular swage bosses 476 and 477 (before swaging), but not necessarily to the annular swage bosses 474 and 475 (after swaging). Nevertheless, whichever design inequalities (described earlier with respect to FIG. 2 or 3) apply to the pair of annular swage bosses 476 and 477 before swaging (as shown in FIG. 4), preferably would also apply to the pair of annular swage bosses 474 and 475 before swaging.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
    a disk drive base;
    a rotary spindle attached to the disk drive base;
    a disk attached to the rotary spindle;
    a head stack assembly attached to the disk drive base, the head stack assembly comprising:
        a first actuator arm, having a first actuator arm tip that includes a first swaging hole, the first swaging hole being centered about a swaging axis;
        a first suspension assembly having a first swage boss that protrudes into the first swaging hole, the first swage boss being annular about the swaging axis, a first read head being attached to the first suspension assembly; and
        a second suspension assembly having a second swage boss that protrudes into the first swaging hole, the second swage boss being annular about the swaging axis, the second swage boss not contacting the first swage boss;
        wherein the first swage boss includes a first inner lip, the first inner lip extending radially closer to the swaging axis than any other part of the first swage boss, the first inner lip defining a first inner lip thickness measured parallel to the swaging axis;
        wherein the second swage boss includes a second inner lip, the second inner lip extending radially closer to the swaging axis than any other part of the second swage boss, the second inner lip defining a second inner lip thickness measured parallel to the swaging axis; and
        wherein the first inner lip thickness increases more greatly with increasing radial distance from the swaging axis than does the second inner lip thickness.

2. The disk drive of claim 1 wherein an increase of the first inner lip thickness with increasing radial distance from the swaging axis defines a first taper angle, an increase of the second inner lip thickness with increasing radial distance from the swaging axis defines a second taper angle, and wherein the first taper angle is greater than the second taper angle by at least 4 degrees.

3. The disk drive of claim 1 wherein the second inner lip thickness at an extent of the second inner lip that is closest to the swaging axis is greater than the first inner lip thickness at an extent of the first inner lip that is closest to the swaging axis.

4. The disk drive of claim 3 wherein the second inner lip thickness at an extent of the second inner lip that is closest to the swaging axis is at least 30 microns greater than the first inner lip thickness at an extent of the first inner lip that is closest to the swaging axis.

5. The disk drive of claim 1 wherein
the first swage boss protrudes from a first swage mount of the first suspension assembly, the first swage mount including a first flat face that faces the first actuator arm tip, and
the second swage boss protrudes from a second swage mount of the second suspension assembly, the second swage mount including a second flat face that faces the first actuator arm tip, and
the first swage boss defines a first swage boss radial thickness measured along a first radius that extends from the swaging axis and is tangent to the first flat face, and
the second swage boss defines a second swage boss radial thickness measured along a second radius that extends from the swaging axis and is tangent to the second flat face, and
the first swage boss radial thickness is greater than the second swage boss radial thickness.

6. The disk drive of claim 5 wherein the first swage boss radial thickness is at least 50 microns greater than the second swage boss radial thickness.

7. The disk drive of claim 1 wherein
the first actuator arm tip defines a first actuator arm tip thickness that is bisected by a first half-thickness plane, the first half-thickness plane being normal to the swaging axis, and
the first swage boss includes a first apex face, no surface of the first swage boss being closer to the first half-thickness plane than the first apex face, and
the second swage boss includes a second apex face, no surface of the second swage boss being closer to the first half-thickness plane than the second apex face, and
wherein a first relief angle between the first apex face and the first half-thickness plane is at least 4 degrees greater than a second relief angle between the second apex face and the first half-thickness plane.

8. The disk drive of claim 1 wherein the head stack assembly further comprises:
a second actuator arm, having a second actuator arm tip that includes a second swaging hole, the second swaging hole being centered about the swaging axis;
a third suspension assembly having a third swage boss that protrudes into the second swaging hole, the third swage boss being annular about the swaging axis; and
a fourth suspension assembly having a fourth swage boss that protrudes into the second swaging hole, the fourth swage boss being annular about the swaging axis, no swage boss being in contact with any other swage boss;
wherein the third swage boss includes a third inner lip, the third inner lip extending radially closer to the swaging axis than any other part of the third swage boss, the third inner lip defining a third inner lip thickness measured parallel to the swaging axis;
wherein the fourth swage boss includes a fourth inner lip, the fourth inner lip extending radially closer to the swaging axis than any other part of the fourth swage boss, the fourth inner lip defining a fourth inner lip thickness measured parallel to the swaging axis; and
wherein the third inner lip thickness increases more greatly with increasing radial distance from the swaging axis than does the fourth inner lip thickness.

9. The disk drive of claim 8 wherein
an increase of the first inner lip thickness with increasing radial distance from the swaging axis defines a first taper angle,
an increase of the second inner lip thickness with increasing radial distance from the swaging axis defines a second taper angle,
an increase of the third inner lip thickness with increasing radial distance from the swaging axis defines a third taper angle,
an increase of the fourth inner lip thickness with increasing radial distance from the swaging axis defines a fourth taper angle, and
wherein the first taper angle is greater than the second taper angle by at least 4 degrees, and
wherein the third taper angle substantially equals the first taper angle, and the fourth taper angle substantially equals the second taper angle.

10. The disk drive of claim 8 wherein the fourth inner lip thickness at an extent of the fourth inner lip that is closest to the swaging axis is at least 30 microns greater than the third inner lip thickness at an extent of the third inner lip that is closest to the swaging axis.

11. The disk drive of claim 8 wherein
the first swage boss protrudes from a first swage mount of the first suspension assembly, the first swage mount including a first flat face that faces the first actuator arm tip, and
the second swage boss protrudes from a second swage mount of the second suspension assembly, the second swage mount including a second flat face that faces the first actuator arm tip, and
the third swage boss protrudes from a third swage mount of the third suspension assembly, the third swage mount including a third flat face that faces the second actuator arm tip, and
the fourth swage boss protrudes from a fourth swage mount of the fourth suspension assembly, the fourth swage mount including a fourth flat face that faces the second actuator arm tip, and
the first swage boss defines a first swage boss radial thickness measured along a first radius that extends from the swaging axis and is tangent to the first flat face, and
the second swage boss defines a second swage boss radial thickness measured along a second radius that extends from the swaging axis and is tangent to the second flat face, and
the third swage boss defines a third swage boss radial thickness measured along a third radius that extends from the swaging axis and is tangent to the third flat face, and
the fourth swage boss defines a fourth swage boss radial thickness measured along a fourth radius that extends from the swaging axis and is tangent to the fourth flat face, and
the first swage boss radial thickness is at least 50 microns greater than the second swage boss radial thickness, and
the third swage boss radial thickness substantially equals the first swage boss radial thickness, and
the fourth swage boss radial thickness substantially equals the second swage boss radial thickness.

12. The disk drive of claim 11 wherein the first, second, third, and fourth flat faces are substantially parallel to each other, and wherein the second flat face faces the third flat face, and wherein the first flat face faces away from the second flat face, and wherein the fourth flat face faces away from the third flat face.

13. The disk drive of claim 8 wherein
  the second actuator arm tip defines a second actuator arm tip thickness that is bisected by a second half-thickness plane, the second half-thickness plane being normal to the swaging axis, and
  the third swage boss includes a third apex face, no surface of the third swage boss being closer to the second half-thickness plane than the third apex face, and
  the fourth swage boss includes a fourth apex face, no surface of the fourth swage boss being closer to the second half-thickness plane than the fourth apex face, and
  wherein a third relief angle between the third apex face and the second half-thickness plane is at least 4 degrees greater than a fourth relief angle between the fourth apex face and the second half-thickness plane.

14. The disk drive of claim 13 wherein the first actuator arm tip defines a first actuator arm tip thickness, and wherein the second actuator arm tip thickness substantially equals the first actuator arm tip thickness.

15. A head stack assembly (HSA) for a disk drive, the HSA comprising:
  a first actuator arm, having a first actuator arm tip that includes a first swaging hole, the first swaging hole being centered about a swaging axis;
  a first suspension assembly having a first swage boss that protrudes into the first swaging hole, the first swage boss being annular about the swaging axis, a first read head being attached to the first suspension assembly; and
  a second suspension assembly having a second swage boss that protrudes into the first swaging hole, the second swage boss being annular about the swaging axis, the second swage boss not contacting the first swage boss;
  wherein the first swage boss includes a first inner lip, the first inner lip extending radially closer to the swaging axis than any other part of the first swage boss, the first inner lip defining a first inner lip thickness measured parallel to the swaging axis;
  wherein the second swage boss includes a second inner lip, the second inner lip extending radially closer to the swaging axis than any other part of the second swage boss, the second inner lip defining a second inner lip thickness measured parallel to the swaging axis; and
  wherein the first inner lip thickness increases more greatly with increasing radial distance from the swaging axis than does the second inner lip thickness.

16. The HSA of claim 15 wherein an increase of the first inner lip thickness with increasing radial distance from the swaging axis defines a first taper angle, an increase of the second inner lip thickness with increasing radial distance from the swaging axis defines a second taper angle, and wherein the first taper angle is greater than the second taper angle by at least 4 degrees.

17. The HSA of claim 15 wherein the second inner lip thickness at an extent of the second inner lip that is closest to the swaging axis is at least 30 microns greater than the first inner lip thickness at an extent of the first inner lip that is closest to the swaging axis.

18. The HSA of claim 15 wherein
  the first swage boss protrudes from a first swage mount of the first suspension assembly, the first swage mount including a first flat face that faces the first actuator arm tip, and
  the second swage boss protrudes from a second swage mount of the second suspension assembly, the second swage mount including a second flat face that faces the first actuator arm tip, and
  the first swage boss defines a first swage boss radial thickness measured along a first radius that extends from the swaging axis and is tangent to the first flat face, and
  the second swage boss defines a second swage boss radial thickness measured along a second radius that extends from the swaging axis and is tangent to the second flat face, and
  the first swage boss radial thickness is greater than the second swage boss radial thickness.

19. The HSA of claim 18 wherein the first swage boss radial thickness is at least 50 microns greater than the second swage boss radial thickness.

20. The HSA of claim 15 further comprising:
  a second actuator arm, having a second actuator arm tip that includes a second swaging hole, the second swaging hole being centered about the swaging axis;
  a third suspension assembly having a third swage boss that protrudes into the second swaging hole, the third swage boss being annular about the swaging axis; and
  a fourth suspension assembly having a fourth swage boss that protrudes into the second swaging hole, the fourth swage boss being annular about the swaging axis, no swage boss being in contact with any other swage boss;
  wherein the third swage boss includes a third inner lip, the third inner lip extending radially closer to the swaging axis than any other part of the third swage boss, the third inner lip defining a third inner lip thickness measured parallel to the swaging axis;
  wherein the fourth swage boss includes a fourth inner lip, the fourth inner lip extending radially closer to the swaging axis than any other part of the fourth swage boss, the fourth inner lip defining a fourth inner lip thickness measured parallel to the swaging axis; and
  wherein the third inner lip thickness increases more greatly with increasing radial distance from the swaging axis than does the fourth inner lip thickness.

21. The disk drive of claim 20 wherein
  an increase of the first inner lip thickness with increasing radial distance from the swaging axis defines a first taper angle,
  an increase of the second inner lip thickness with increasing radial distance from the swaging axis defines a second taper angle,
  an increase of the third inner lip thickness with increasing radial distance from the swaging axis defines a third taper angle,
  an increase of the fourth inner lip thickness with increasing radial distance from the swaging axis defines a fourth taper angle, and
  wherein the first taper angle is greater than the second taper angle by at least 4 degrees, and
  wherein the third taper angle substantially equals the first taper angle, and the fourth taper angle substantially equals the second taper angle.

22. The HSA of claim 20 wherein the fourth inner lip thickness at an extent of the fourth inner lip that is closest to the swaging axis is at least 30 microns greater than the third inner lip thickness at an extent of the third inner lip that is closest to the swaging axis.

23. The HSA of claim 20 wherein
  the first swage boss protrudes from a first swage mount of the first suspension assembly, the first swage mount including a first flat face that faces the first actuator arm tip, and the second swage boss protrudes from a second swage mount of the second suspension assembly, the second swage mount including a second flat face that faces the first actuator arm tip, and the third swage mount including a third flat face that faces the second actuator arm tip, and the fourth swage boss protrudes from a fourth swage mount of the fourth suspension assembly, the fourth swage mount including a fourth flat face that faces the second actuator arm tip, and the first swage boss defines a first swage boss radial thickness measured along a first radius that extends from the swaging axis and is tangent to the first flat face, and the second swage boss defines a second swage boss radial thickness measured along a second radius that extends from the swaging axis and is tangent to the second flat face, and the third swage boss defines a third swage boss radial thickness measured along a third radius that extends from the swaging axis and is tangent to the third flat face, and the fourth swage boss defines a fourth swage boss radial thickness measured along a fourth radius that extends from the swaging axis and is tangent to the fourth flat face, and the first swage boss radial thickness is at least 50 microns greater than the second swage boss radial thickness, and the third swage boss radial thickness substantially equals the first swage boss radial thickness, and the fourth swage boss radial thickness substantially equals the second swage boss radial thickness.

24. The HSA of claim 23 wherein the first, second, third, and fourth flat faces are substantially parallel to each other, and wherein the second flat face faces the third flat face, and wherein the first flat face faces away from the second flat face, and wherein the fourth flat face faces away from the third flat face.

* * * * *